Nov. 24, 1970  E. AGERMAN ET AL  3,543,063
DIRECTLY COOLED ELECTRICAL MACHINE
Filed June 30, 1969  2 Sheets-Sheet 2
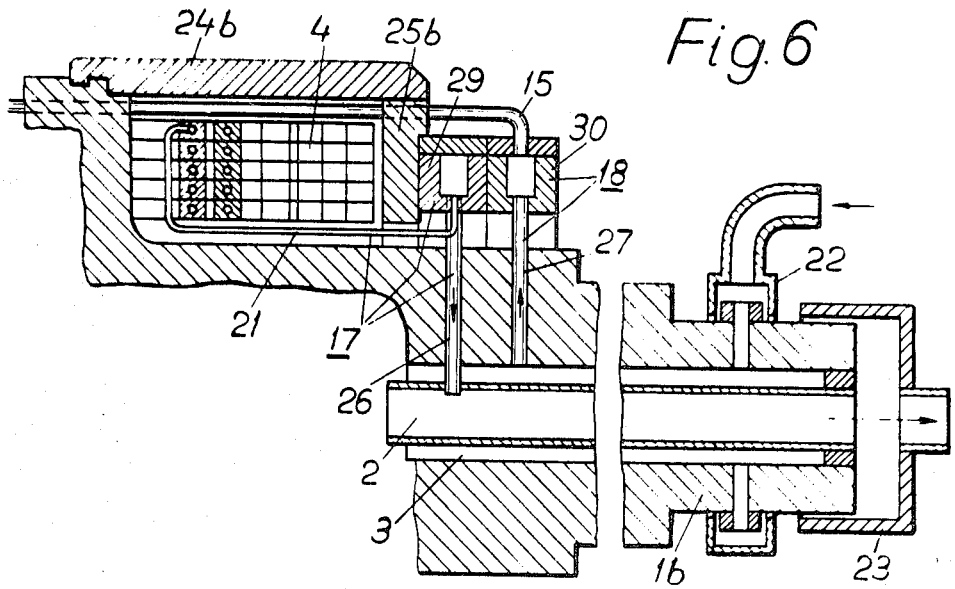
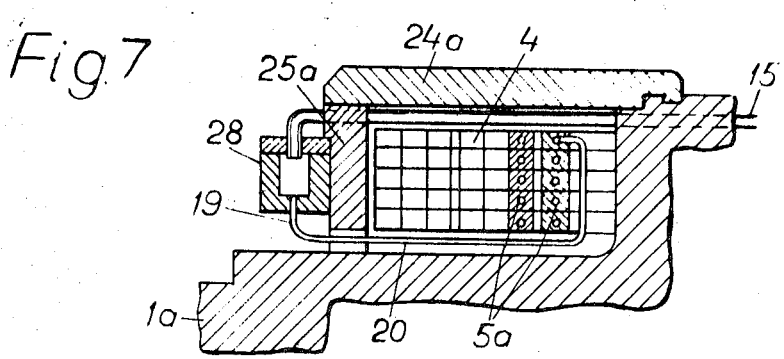
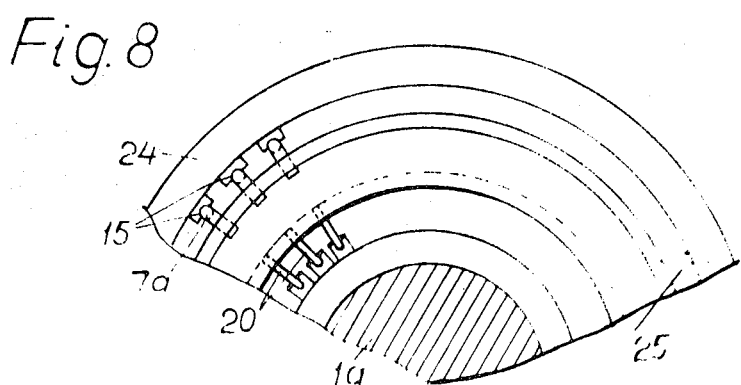
ERIK AGERMAN
EDGAR ESSEN
SVEN HELMERSSON
BIRGER JONSSON
OLAV KARSTEN
RICHARD BIVERTSEN
OVE TJERNSTROM
INVENTORS
BY

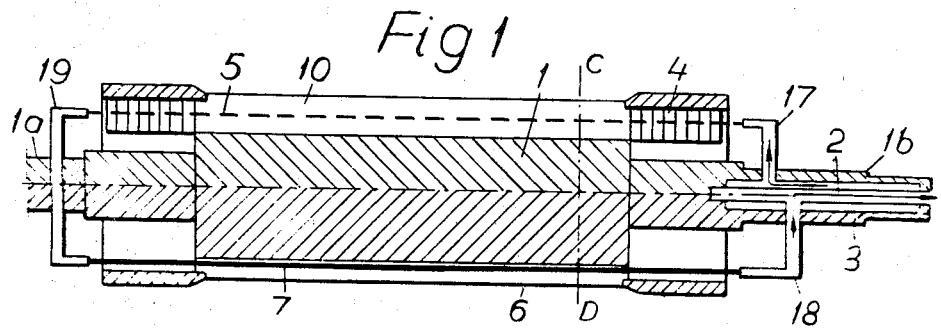
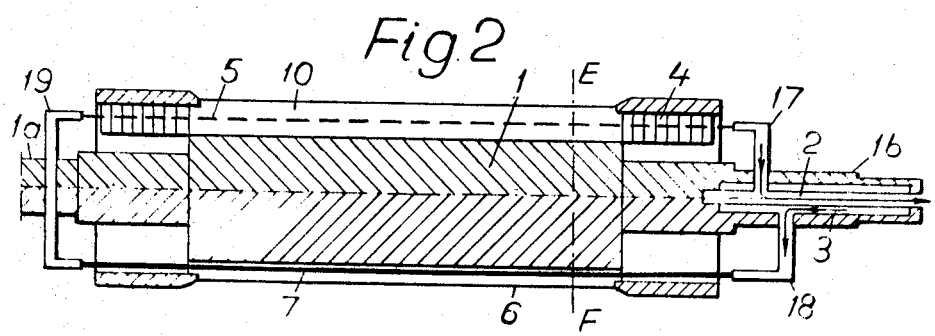
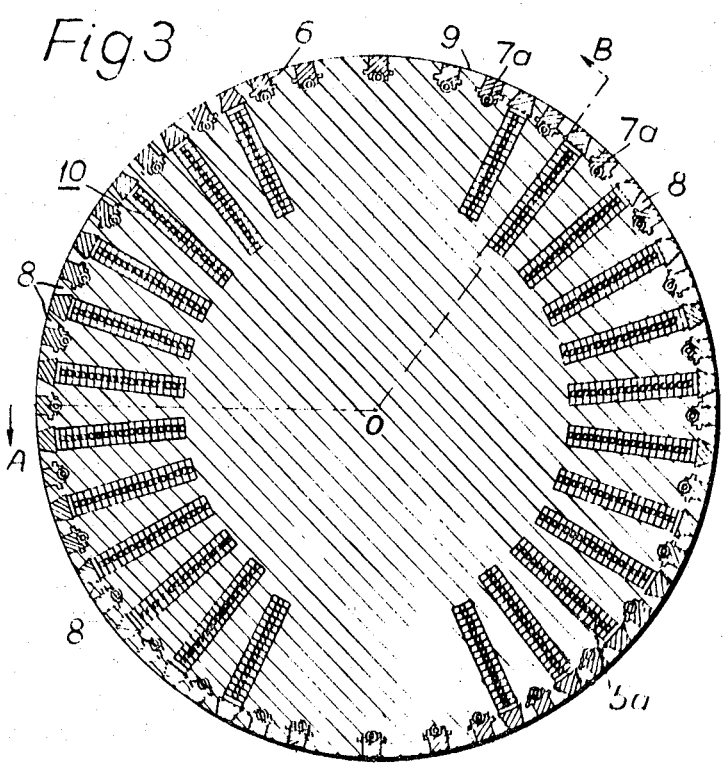
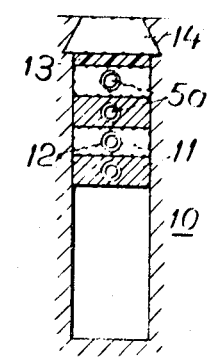
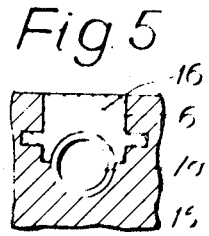

United States Patent Office 3,543,063
Patented Nov. 24, 1970

3,543,063
DIRECTLY COOLED ELECTRICAL MACHINE
Erik Agerman, Ludvika, Edgar Essen and Sven Helmersson, Vasteras, Birger Jonsson, Hokasen, Olav Karsten and Richard Sivertsen, Vasteras, and Ove Tjernstrom, Irsta, Sweden, assignors to Allmanna Svenska Elektriska Aktiebolaget, Vasteras, Sweden, a Swedish corporation
Continuation-in-part of application Ser. No. 694,999, Jan. 2, 1968. This application June 30, 1969, Ser. No. 837,496
Claims priority, application Sweden, Jan. 3, 1967, 68/67
Int. Cl. H02k 1/32
U.S. Cl. 310—61                                    2 Claims

ABSTRACT OF THE DISCLOSURE

A rotor for directly cooled electrical machines has an annular body of magnetic material in which are arranged slots extending lengthwise of the rotor for receiving the windings. The rotor has a cooling system intended for direct cooling of conductors situated in the winding slots and, in addition to this, a cooling system comprising cooling channels extending lengthwise through the rotor teeth, further from the rotor axis than the bottoms of the winding slots. Each of the cooling systems has inlets and outlets at different ends of the rotor and the two systems are series-connected.

PRIOR APPLICATION

This application is a continuation-in-part of application S.N. 694,999 filed Jan. 2, 1968, now abandoned.

BACKGROUND OF THE INVENTION

Field of the invention

The invention relates to a directly cooled electrical machine, and particularly a rotor.

The prior art

To cool an electrical machine it is known to arrange several cooling channels in the winding slot of the machine, for example a channel in each of the conductors of the slot. These channels are intended to transport a cooling fluid which, by direct contact with the conductors, provides an efficient cooling of the windings of the machine. Channels of this type have been arranged both in the stator and in the rotor of the machine.

If the rotor of the machine is cooled in this way, the risk of unbalance in the rotor due to deformations caused by uneven heating of the rotor along its circumference is greater than with machines which are air cooled in the conventional manner. This is because the windings themselves are cooled extremely effectively whereas parts of the rotor between the windings are relatively less effectively cooled than is the case, for example, with air cooled machines. In directly cooled rotors where most of the heat developed in the iron core is led to the rotor winding it is hardly possible to predetermine a thermal resistance of the different heat flux paths in such a way that symmetrically situated parts of the iron core carry the same heat flux. Uncontrollable differences, for example, as regards the thermal resistance between winding and core may have the effect that certain parts of the rotor core expand more in an axial direction than other, and, unless the most expanded parts are equally expanded and diametrically situated, may produce distortion and thereby unbalance in the rotor.

SUMMARY OF THE DISCLOSURE

According to the invention this risk of unbalance is avoided or decreased by furnishing the rotor with two co-operating cooling systems, one of which is intended for direct cooling of the winding, the other for cooling of iron parts only. The latter is carried out by arranging additional cooling channels in the central pole-parts and/or teeth of the rotor within a certain distance from the periphery of the rotor.

In this way a more even cooling of radially outer parts of the rotor is obtained along the entire circumference. The cooling channels intended for direct cooling of the winding parts retained in the winding slots are arranged to lead the coolant along the rotor body in an axial direction. The additional cooling channels, which are intended for cooling of iron parts surrounded by the rotor winding and arranged in such parts, fulfill at the same time the task of serving as a return path for the coolant which has passed the rotor winding, and they can easily be dimensioned with relatively low hydraulic resistance. Thus an inlet as well as an outlet duct for the total cooling system can be provided at one end of the rotor only, and a relatively convenient and inexpensive construction can be used.

In order to obtain an even cooling of the winding itself, it is usually necessary to arrange a plurality of channels in each winding slot evenly distributed over the cross section of the winding. As the total required heat transfer from the iron to the additional channels mentioned above is much smaller than the total required heat transfer between electrical conductors and cooling channels in the slots, the total heat-transferring surface required is much smaller in the first mentioned case, and accordingly channels with relatively large cross section can be used in this case. The number of additional cooling channels required is considerably lower than the total number of channels in the winding slots.

Unbalance of the kind occurring in the rotor because of unavoidable differences between the temperatures of diametrically oppositely situated parts of the rotor core is as mentioned avoided or reduced according to the invention by furnishing the rotor core with an iron-embedded cooling system. However, the mere presence of such a system alone is not sufficient for acquiring the desired effect. A conventional cooling system is only intended to keep the temperature of the cooled parts below a certain maximum temperature and it is considered unfavorable to use a stronger flow of cooling medium than is necessary for this purpose. If, in such a conventional cooling system, one of the branches of the system is situated in a machine part of especially high temperature, it is considered fully acceptable that the cooling medium of this branch be heated to a very high temperature provided the machine part in question remains below the highest permissible temperature. As regards the iron-embedded cooling system of a rotor according to the invention, however, it is of great importance that the temperature of the cooling medium flowing through a cooling channel as far as possible is independent of the character of the heat-conducting connections between the cooling channel and a neighboring rotor conductor. To comply with this demand, it is necessary to provide a cooling system which—from a conventional point of view—is "over-dimensioned" as far as the flow of cooling medium flowing through it is concerned, this being much greater than the flow required to ensure the highest permissible temperature in the machine. In a rotor according to the invention it is evident that the iron-embedded cooling system is over-dimensioned in this respect, as the entire quantity of cooling medium supplied to the rotor winding, is also supplied to the iron-embedded cooling system, in spite of the fact that the iron losses are only a small fraction of the copper losses.

BRIEF DESCRIPTION OF THE DRAWINGS

The invention is best understood with reference to the accompanying drawings, in which:

FIGS. 1 and 2 show in longitudinal cross-section two forms of rotors embodying the invention, the upper half being a section along the line OB in FIG. 3 and the lower part a section along the line OA in FIG. 3.

FIG. 3 is a transverse cross-section on the line CD of FIG. 1 or EF of FIG. 2.

FIGS. 4 and 5 are an enlargement of parts of FIG. 3.

FIG. 6 is an end view of a rotor.

FIGS. 6 and 7 show details of the right and left end respectively of the rotor shown in FIG. 2, and FIG. 8 is an end view of FIG. 7.

DESCRIPTION OF THE PREFERRED EMBODIMENTS

Each of FIGS. 1 and 2 shows a rotor in sections along axial planes. The rotors are almost identical and differ only with respect to connections to the main ducts. In the drawings, 1 designates a rotor body provided with winding slots 10. The rotor has two shaft ends 1a and 1b. The shaft end 1a is solid, whereas the shaft end 1b is provided with a central bore which is divided by a tubular separating wall into an inner duct 2 and an outer duct 3 concentric with duct 2. 4 indicates coil ends, that is, parts of the winding situated axially outside the slots in the rotor. The cooling system comprising channels 5a in the slots 10 as indicated in FIGS. 1 and 2 by the dotted line 5, and the cooling system intended for iron parts and comprising cooling channels 7a in the central parts 9 or one of the teeth 8 of the rotor is indicated by the unbroken line 6. The arrows in the figures show the flow direction of the coolant.

In FIG. 4 a cross-section of a winding slot 10 is shown. The winding slot contains a plurality of conductors 11 which conductors are insulated from each other. The cooling channels 5a are made by embedding an axially directed cooling tube 12 in each conductor 11. The slot is closed by the wedge 14. 13 is a body of insulating material.

FIG. 5 shows in cross-section the construction of additional cooling channels 7a. Each of the channels 7a is defined by a cooling tube 15 which is retained in a cooling slot 6 by means of a wedge 16 which, as well as the bottom of the slot 6, is formed to fit the cooling tube, so that effective heat transfer is obtained.

In FIG. 1 the cooling system 5 is connected to the main inlet duct 3 through the connecting means 17 and the cooling system 7 is connected to the main outlet duct 2 through the connecting means 18. At the opposite rotor end the outlets of the system 5 are connected to the inlets of the system 7 through the connecting means 19. The means 17, 18, 19 are constructed and mounted in conventional manner, for example as shown and described in U.S. Pat. No. 3,340,412 and No. 3,075,104.

The embodiment shown in FIG. 2 differs from that of FIG. 1 in that the means 17 are connected to the outlet duct 2 instead of to the inlet duct 3 and correspondingly the means 18 is connected to the duct 3 instead of duct 2.

The hydraulic interconnections of the cooling channels 5a of the cooling system 5 may be carried out in any convenient way, for example as shown in FIGS. 6 to 8 or in FIGS. 8 and 11 of the U.S. Pat. No. 3,075,104.

A plurality of coolant tubes 21 provide hydraulic connection between the cooling system 5 and the distribution ring 29, which is connected to the outlet duct 2 by means of radial channels 26 in the shaft. 21, 29 and 26 constitute the means 17, whereas 30 and 27 constitute the means 18, and 28 and 20 the means 19. The retaining rings are designated by 24a and 24b and the end rings by 25a and 25b. 22 and 23 are stationary inlet and outlet sleeves, respectively.

In the embodiment shown in FIG. 1 the coolant, usually water, first passes the channels 5a of the rotor winding and is then led back to the outlet duct 3 through the channels 7a of the iron-embedded system.

In FIG. 2 the cooling water first passes through the wide channels 7a in the rotor body before being led through the winding. With this arrangement, as well as with that of FIG. 1, the temperature rise of the cooling water during its passage through the wide channels in the rotor body, for reasons mentioned previously, will be rather moderate. However, there is the important difference that the temperature of this water according to FIG. 2 is practically the same as the temperature of the cooling water supplied to the inlet duct 3, and accordingly rather low.

If during constant operation the cooling systems 5 and 7 are connected to ducts 2 and 3 according to FIG. 2, a certain heat transport normally takes place directly from the winding to the iron mass of the rotor body mainly in a tangential direction, since the temperature of the winding in this case will be somewhat higher than that of the rotor body, that is, the temperature of the teeth and the central parts of the poles. With an arrangement according to the FIG. 1, however, heat is transported in the opposite direction, that is from the iron to the winding. If, in the last mentioned case, a sudden reduction of the generator load takes place, the winding will be rapidly cooled down to a temperature corresponding to the new conditions, whereas the rotor iron, because of greater mass and poorer contact between the heated mass and the cooling medium, needs a rather long time to reach the new and lower temperature of the cooling medium. In the meantime a relatively great flux of heat will pass from the iron to the conductors of the winding slot through the electrical insulation surrounding them. Different heat resistance, for example in this insulation, may then cause a certain thermal asymmetry. Accordingly the embodiment of the invention shown in FIG. 2 is the most advantageous if the operational conditions involve great and rapid load reductions.

The arrangement according to FIG. 2 also has the advantage that the risk of corrosion in the cooling channels in the rotor body is decreased. The reason for this is that the oxygen content of the cooling water is lowest before it passes the winding since oxygen is formed through electrolysis in connection with the winding. A low oxygen content is a condition for the prevention of corrosion in the cooling channels of the rotor body.

We claim:

1. Rotor for directly cooled electrical machine, comprising a rotor body and first and second shaft ends, a plurality of axially directed winding slots formed in said rotor body, axially directed winding parts retained in said winding slots and coil ends connected with said winding parts, a coolant inlet and a coolant outlet duct in said first shaft end, a direct cooling system comprising a plurality of first, axially directed cooling channels intended for direct cooling of said axially directed winding parts and located in the winding slots, an iron-embedded cooling system with a plurality of second, axially directed cooling channels located between the winding slots and further from the rotor axis than the bottoms of the winding slots, first, second and third hydraulic connecting means, each of said systems having inlet openings axially outside one end of the rotor body, and outlet openings axially outside the other end, said first and second connecting means being arranged in the vicinity of said first shaft end to connect the inlet openings of one of said cooling systems to said inlet duct and the outlet openings of the other cooling system to said outlet duct, respectively, said third connecting means being arranged in the vicinity of said second shaft end to connect the outlet openings of one of said cooling systems with the inlet openings of the other.

2. A rotor according to claim 1, in which the outlet openings of said iron-embedded cooling system are connected to the inlet openings of said direct cooling system.

(References on following page)

References Cited

UNITED STATES PATENTS

| | | | |
|---|---|---|---|
| 1,853,646 | 4/1932 | Von Kando | 310—54 |
| 2,527,878 | 10/1950 | Fechheimer | 310—54 |
| 2,975,309 | 3/1961 | Seidner | 310—54 |
| 3,014,139 | 12/1961 | Shildneck | 310—64 |
| 3,240,967 | 3/1966 | Krastchew | 310—61 X |
| 3,340,412 | 9/1967 | Wiedemann | 310—61 X |

DONOVAN F. DUGGAN, Primary Examiner

U.S. Cl. X.R.

310—64